Figure 1:
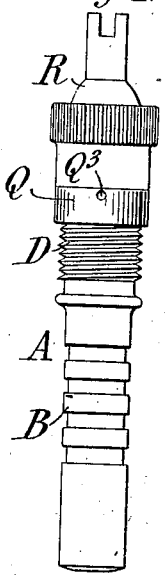

H. P. KRAFT.
TIRE VALVE.
APPLICATION FILED JULY 25, 1914.

1,200,623.

Patented Oct. 10, 1916.
2 SHEETS—SHEET 1.

INVENTOR
Henry P. Kraft,
By Attorneys,

WITNESSES:
René Bruine
Fred White

H. P. KRAFT.
TIRE VALVE.
APPLICATION FILED JULY 25, 1914.

1,200,623.

Patented Oct. 10, 1916.
2 SHEETS—SHEET 2.

WITNESSES:
René Bruine
Fred White

INVENTOR:
Henry P. Kraft,
By Attorneys,
Fraser

UNITED STATES PATENT OFFICE.

HENRY P. KRAFT, OF RIDGEWOOD, NEW JERSEY.

TIRE-VALVE.

1,200,623.   Specification of Letters Patent.   Patented Oct. 10, 1916.

Application filed July 25, 1914. Serial No. 853,126.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Valves, of which the following is a specification.

This invention relates to tire valves, and aims to provide certain improvements therein.

The invention is directed toward that form of tire or other valve which normally has a spring pressing the valve to its seat, although it may be used in connection with valves which are loosely mounted, and require air or other pressure to close them in use. Spring-pressed valves have very largely gone into use for pneumatic tires or similar purposes, the spring being desirable to insure tight closing of the valve, particularly under low pressures. In tire valves or other small valves, particularly of the Schrader type, the valve mechanism, comprising a valve proper and its seat, are removable bodily from the shell or casing, and the spring is placed under tension during the act of insertion. In such valves the valve proper is necessarily very small, and its seating face is composed of rubber which by reason of the small size of the valve proper cannot be made of large dimensions. Practice has shown that the packing of the valve must be more or less resilient, and a comparatively soft rubber is hence used for this purpose. It has been found in practice that with this type of valve the pressure of the valve against its seat is apt to form a depression in the rubber packing. This is necessary in the operation of the valve in use, but while the valve is not in use such pressure is detrimental. After the valves are manufactured considerable time often elapses before they go into use and it is the object of the present invention to provide means for depressing the valve to hold it away from its seat during such time, so that when the valve is put in use the valve packing still has a smooth and efficient seating surface. Such means must necessarily be very cheap and sufficiently strong and durable to withstand the ordinary shocks of transportation and handling. Preferably also the means so employed permit the attachment of the usual valve cap to the valve casing either directly upon the latter or in connection with the depressing means. The invention hence includes a complete valve, consisting of a casing, a depressor, and a cap united or connected in such manner as to constitute a single article of manufacture.

Figure 2:
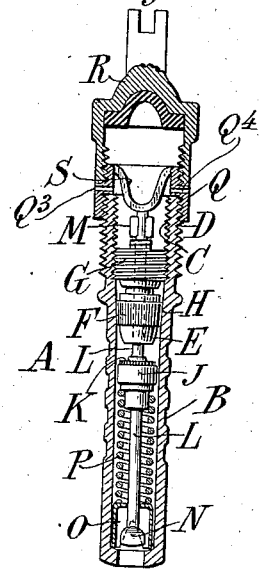
Figures 3, 4, 5:
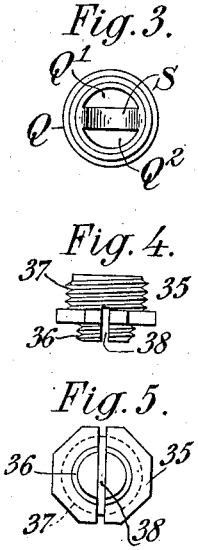
Figure 9:
Figure 10:
Figure 6:
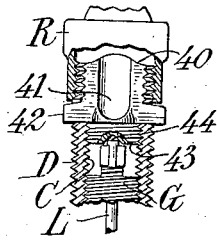
Figure 7:
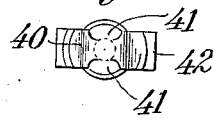
Figure 8:
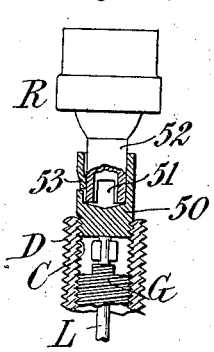
Figure 12:
Figure 11:
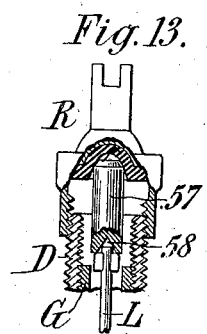
Figures 13, 14, 15:
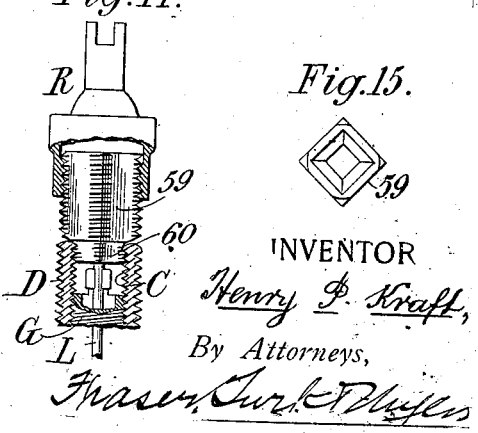
Figure 16:
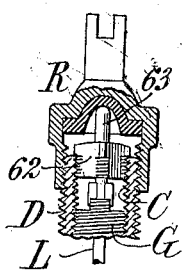
Figure 18:
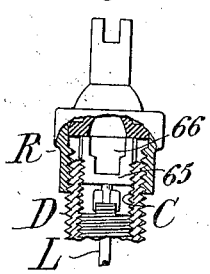
Figure 20:
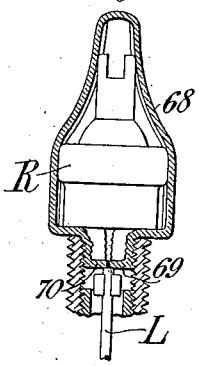
Figure 22:
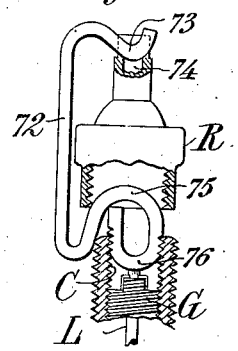
Figure 17:
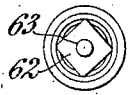
Figure 19:
Figure 21:
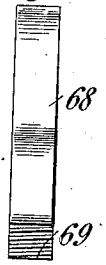
Figure 23:
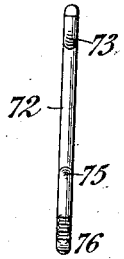
Figure 24:
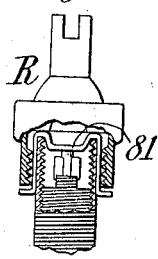
Figure 26:
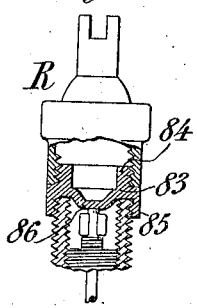
Figure 27:
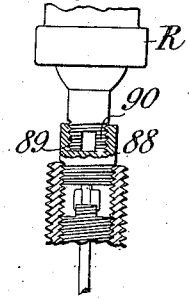
Figure 28:
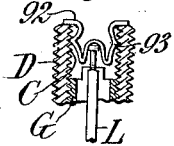
Figure 25:
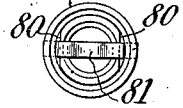

In the drawings, wherein are shown a number of forms of the invention,—Figure 1 is an elevation of a valve showing the preferred form of the invention. Fig. 2 is a diametrical section of Fig. 1. Fig. 3 is a plan view of the depressor. Fig. 4 is a side elevation of a modification. Fig. 5 is an under side view thereof. Fig. 6 is a diametrical section of another modification. Fig. 7 is a top view of the depressor of Fig. 6. Fig. 8 is a diametrical section of another modification. Fig. 9 is an elevation of the depressor of Fig. 8. Fig. 10 is a top view of Fig. 9. Fig. 11 is a diametrical section of another modification. Fig. 12 is a side view of the depressor of Fig. 11. Fig. 13 is a diametrical section of another modification. Fig. 14 is a similar view of another modification. Fig. 15 is a top view of the depressor of Fig. 14. Fig. 16 is a diametrical section of another modification. Fig. 17 is a top view of Fig. 16 with the cap removed. Fig. 18 is a diametrical section of another modification. Fig. 19 is a top view of Fig. 18 with the cap removed. Fig. 20 is a diametrical view of another modification. Fig. 21 is a side elevation of the depressor of Fig. 20. Fig. 22 is a diametrical view of another modification. Fig. 23 is an elevation of the depressor of Fig. 22. Fig. 24 is a diametrical section of another modification. Fig. 25 is a top view of Fig. 24 with the cap removed. Fig. 26 is a diametrical view of another modification. Fig. 27 is a diametrical view of another modification. Fig. 28 is a diametrical view of another modification.

Referring first to Figs. 1 to 3 of the drawings, let A indicate a tire valve which comprises a shell B of suitable dimensions having an internal screw-thread C at its top and an external screw-thread D also at its top. E is the valve seat which is provided with a packing F of rubber or other suitable material, and G is a screw-threaded plug which is swiveled to the seat member E, so that when the plug G is screwed down within the valve it presses the seat downwardly until the packing F makes contact with a tapered shoulder H. J is the valve proper which is provided with a packing K adapted to make contact with the seat E. The plug G and seat E are provided with a bore through which passes a pin L connected to and preferably running through the valve proper J. The lower end of the pin passes through a sheet metal guide O between which and the valve proper is located a loading spring P. The top of the pin L is upset or swaged, as shown at M, and its bottom is similarly upset or swaged, as shown at N. The pin acts to hold all of the parts together, and as its ends are enlarged by the swaged portions M and N, none of the parts can become separated. The spring P normally presses the valve proper J upwardly, so that the packing K is always in contact with the seat E except when the valve is depressed during the pumping operation. This constant contact of the packing K and seat E is injurious to the packing. It cannot be avoided when the valve is in use, but while the valve is being carried in stock or before it is used, this contact is unnecessary and injurious to the packing of the valve, often causing leakage. According to the preferred form of the invention there is provided a depressor Q which is adapted to maintain the valve away from its seat, as shown in Fig. 2, and which also preferably is adapted to hold the valve cap R so that the valve is sold as an article of manufacture comprising a casing, valve proper, depressor and cap connected to form a structure which, while temporary, is nevertheless unitary until the valve is put into actual use. In the preferred form the depressor Q is formed of a sheet metal cup the bottom of which is cut away at $Q^1$, $Q^2$ to leave a tongue or strip S which is forced inwardly in loop form and engages the top of the pin M, thus depressing the valve from its seat as shown in Fig. 2. The depressor is formed wth an internal thread which engages the top of the valve casing, and an external thread which engages the valve cap R. When the valve is about to be placed into use in a tire, the depressor Q is designed to be discarded. In order to avoid any possibility that it will be retained, the depressor is formed with a hole or holes $Q^3$ $Q^4$ or other opening which permits the escape of air from the tire. Thus if a tire is inflated and the depressor is inadvertently retained in the cap, the air within the tire will be permitted to escape when the lower end of the depressor is screwed into the valve casing. This shows at once that the depressor is intended to be removed, and avoids the possibility of the user forming a slow leaking connection which would cause deflation of the tire when the car is in motion.

In Figs. 4 and 5 the depressor is formed of a solid plug 35 which has a reduced portion 36 entering the valve casing and depressing the valve pin, and a body portion 37 on which the valve cap screws. Air is permitted to escape by a slot 38 or other opening.

In Figs. 6 and 7 of the drawings the depressor is shown as formed of a flat blank 40, the sides of which are indented at 41 to squeeze the edges of the metal forward into a screw-threading die to form screw-threads 42. The portion thus formed serves to engage the cap. The lower portion 43, which screws into the valve shell, is in the course of manufacture formed with threads by a center punch which makes a depression 44, pushing the metal outwardly into a second threading die.

In Figs. 8, 9 and 10 the depressor 50 is formed with a screw-threaded lower end which engages the valve pin while its upper end is constructed with a bore 51 into which the upper portion 52 of the valve cap fits. In order to hold the valve cap by friction, it is best to form a lip 52—53 in the depressor which engages the cap as shown in Fig. 8.

In Figs. 11 and 12 the depressor is formed of a short sheet metal tube 55, which is pressed inwardly at 56 so that the opening through the tube is too small to permit the passage through it of the enlarged portion M of the valve stem. The valve stem is pressed downwardly by the upper end of the depressor engaging the packing washer R' of the valve cap, when the cap is screwed upon the casing. In this construction the depressor works equally well if reversed.

In Fig. 13 the depressor 57 is formed of a short length of bar, preferably having a depression 58 in its lower end which engages the valve stem while its upper end engages the packing washer of the cap.

In Figs. 14 and 15 the depressor is formed of a sheet metal cup 59 having a lower extension 60, the cup being preferably square and its corners being screw-threaded as shown.

In Figs. 16 and 17 the depressor 62 is formed of a square body having its corners screw-threaded and is preferably provided with a short extension 63 adapted to be grasped by the fingers to unscrew the depressor. The valve cap in this construction screws onto the valve casing.

In Figs. 18 and 19 the depressor 65 is formed of a flat piece of metal having its lower edges screw-threaded. In this construction the depressor may be stamped from heavy sheet metal if desired, so as to leave a space 66 between the arms of the depressor.

In Figs. 20 and 21 the depressor 68 is formed of a flat piece of sheet metal bent to the general outline of the cap, its lower ends 69, 70 being brought together and having their sides screw-threaded to engage the casing. The body of the depressor is slightly concave so that when the ends 69 and 70 are sprung apart slightly, the valve cap will enter the depressor, and when the latter is screwed onto the valve casing, the valve cap is gripped to hold the cap securely.

In Figs. 22 and 23 the depressor 72 is formed of a piece of wire, the upper end of which 73 is bent as shown to engage the notch in the cap and enter slightly into the bore 74 thereof. The wire is then bent downwardly along the side of the cap and upwardly at 75 to enter the lower opening in the cap, and thence downwardly and upwardly to form the loop 76. The edges of the wire at this point are screw-threaded to engage the casing. There is sufficient spring in the wire to enable the cap to be snapped into engagement with the depressor, so that the latter is held firmly therein until it is desired to remove it.

In Figs. 24 and 25 is shown a form of depressor which is useful for valve casings which are provided with flat portions 80 on each side. In this figure the depressor 81 is shown as a thin piece of sheet metal bent to appropriate form and arranged at the flat portions 80. When so constructed the depressor does not interfere with the screwing of the cap onto the casing.

In Fig. 26 the depressor 83 is formed with a reduced portion 84 which is exteriorly screw-threaded to receive the cap. The lower part of the depressor is formed with a flange 85 which is interiorly screw-threaded to engage the exterior of the casing. A downwardly projecting portion 86 engages the valve stem.

In Fig. 27 the depressor 88 is formed of a piece of rod having its lower ends screw-threaded to engage the casing, and its upper end formed with a screw-threaded socket 89 adapted to receive the upper end of the cap when reversed. The upper end of the cap is in this case screw-threaded as shown at 90.

In Fig. 28 the depressor 92 is constructed of a strip of sheet metal adapted to frictionally engage the interior of the casing, the depressor being preferably provided with projecting portions 93 which bear against the screw-thread of the casing and assist the depressor in holding its position.

The invention may take other forms than those herein shown and described.

What I claim is:—

1. A valve for tires comprising a casing, a valve-proper and a seat in the casing, a cap adapted to tightly close the casing when normally in use, and an intermediate temporary part having means for engaging both the casing and cap and means for holding the valve-proper off of its seat, said intermediate part being adapted to be used when the valve is carried in stock so as to prevent the valve-proper from becoming set and from adhering to the valve seat.

2. A valve for tires, comprising a casing, a valve-proper and a seat in the casing, a cap adapted to tightly close the casing when normally in use, and an intermediate temporary part having means for engaging both the casing and cap and means for holding the valve-proper off of its seat, said intermediate part being adapted to be used when the valve is carried in stock so as to prevent the valve-proper from becoming set and from adhering to the valve seat, the construction of said intermediate part being indifferent respecting a tight closure of the casing.

3. A valve for tires comprising a casing, a valve-proper and a seat in said casing, a cap having a packing adapted to contact with, and tightly close the end of the casing when normally in use, and an intermediate part having means for engaging both the casing and cap and means for holding the valve-proper off of its seat, said intermediate part being adapted to be used when the valve is carried in stock so as to prevent the valve-proper from becoming set and from adhering to the valve seat.

4. A valve for tires comprising a casing, a valve-proper and a seat in said casing, a cap having a packing therein, said cap being adapted to fit upon the exterior of the casing and tightly close the latter when normally in use, and an intermediate temporary part having means for engaging the exterior of the casing and having a reduced portion for engaging the cap, said intermediate part also having means for holding the valve-proper off of its seat, said intermediate part being adapted to be used when the valve is carried in stock so as to prevent the valve proper from becoming set and from adhering to the valve seat.

5. A valve for tires comprising a casing, a valve proper and a seat in said casing, a cap adapted to tightly close the casing when normally in use, and a temporary separable part having means for holding the valve-proper off of its seat, said temporary part being adapted to be used when the valve is carried in stock so as to prevent the valve proper from becoming set and from adhering to the valve seat.

6. A valve for tires comprising a casing-member, a valve-proper and a seat in said casing-member, a cap adapted to tightly close the casing-member when normally in use, and a temporary separable member having means for holding the valve-proper off of its seat, said temporary member being adapted to be used when the valve is carried in stock so as to prevent the valve-proper from becoming set and from adhering to the valve seat, and one of said members being adapted to engage said cap, whereby said members and cap are held together simultaneously.

In witness whereof, I have hereunto signed my name in the presence of two subscribing witnesses.

HENRY P. KRAFT.

Witnesses:
E. G. MYERS,
FRED WHITE.